United States Patent
Li et al.

(10) Patent No.: US 10,575,313 B2
(45) Date of Patent: *Feb. 25, 2020

(54) INTERFERENCE CANCELLATION METHODS USED IN BASE STATIONS AND USER EQUIPMENTS

(71) Applicant: Telefonaktiebolaget LM Ericsson (publ), Stockholm (SE)

(72) Inventors: Shaohua Li, Beijing (CN); Xinghua Song, Beijing (CN); Jianfeng Wang, Beijing (CN); Haochuan Zhang, Beijing (CN); Zhan Zhang, Beijing (CN); Zhang Zhang, Beijing (CN); Zhenshan Zhao, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,952

(22) Filed: Oct. 2, 2018

(65) Prior Publication Data

US 2019/0037576 A1    Jan. 31, 2019

Related U.S. Application Data

(63) Continuation of application No. 14/911,139, filed as application No. PCT/CN2013/081211 on Aug. 9, 2013, now Pat. No. 10,123,337.

(51) Int. Cl.
*H04W 72/08* (2009.01)
*H04W 28/18* (2009.01)
(Continued)

(52) U.S. Cl.
CPC ......... *H04W 72/082* (2013.01); *H04J 11/003* (2013.01); *H04J 11/0053* (2013.01); *H04W 28/18* (2013.01); *H04W 72/042* (2013.01)

(58) Field of Classification Search
CPC . H04W 52/243; H04W 72/082; H04W 48/08; H04W 4/023; H04W 52/10;
(Continued)

(56) References Cited

U.S. PATENT DOCUMENTS

2008/0108363 A1    5/2008  Yu et al.
2010/0009634 A1*   1/2010  Budianu ............. H04W 52/244
                                                            455/63.1
(Continued)

FOREIGN PATENT DOCUMENTS

CN    101594661 A    12/2009
CN    102056292 A     5/2011
(Continued)

*Primary Examiner* — Phuc H Tran
(74) *Attorney, Agent, or Firm* — Murphy, Bilak & Homiller, PLLC

(57) ABSTRACT

The present disclosure relates to a method performed by a BS for facilitating IC at a UE and an associated BS. The method includes predefining one or more sets of transmission parameters, where one or more of the transmission parameters in the one or more sets are constrained to take values from respective reduced sets of values out of the values available for the respective one or more transmission parameters, each set of the one or more sets of transmission parameters being identifiable by a unique indication. The method further includes configuring a transmission of the BS, which is to interfere downlink transmissions to the UE from a serving BS of the UE, by using one of the predefined one or more sets of transmission parameters. The present disclosure also relates to a method in a UE for IC and an associated UE.

24 Claims, 10 Drawing Sheets

(51) Int. Cl.
*H04J 11/00* (2006.01)
*H04W 72/04* (2009.01)

(58) Field of Classification Search
CPC . H04W 52/16; H04W 52/244; H04W 52/365; H04W 72/02; H04W 72/0406; H04W 72/048; H04W 72/08; H04W 72/1268; H04W 74/00; H04W 92/20; H04L 5/0035; H04L 5/0062; H04L 5/143
See application file for complete search history.

(56) References Cited

U.S. PATENT DOCUMENTS

| | | | | |
|---|---|---|---|---|
| 2010/0099449 A1* | 4/2010 | Borran | ............... | H04W 52/243 455/501 |
| 2010/0190447 A1* | 7/2010 | Agrawal | ........... | H04W 72/082 455/63.1 |
| 2012/0257519 A1* | 10/2012 | Frank | ................... | H04L 5/0035 370/252 |
| 2014/0126483 A1* | 5/2014 | Novak | ................ | H04W 72/048 370/329 |
| 2014/0204853 A1* | 7/2014 | Ko | ........................ | H04L 5/0073 370/329 |
| 2015/0117339 A1* | 4/2015 | Siomina | ................ | H04L 1/1854 370/329 |

FOREIGN PATENT DOCUMENTS

| | | |
|---|---|---|
| CN | 102293033 A | 12/2011 |
| CN | 102378189 A | 3/2012 |
| RU | 2429590 C2 | 9/2011 |
| RU | 2010141747 A | 4/2012 |
| RU | 2463739 C2 | 10/2012 |
| WO | 9209148 A1 | 5/1992 |
| WO | 2006007330 A1 | 1/2006 |
| WO | 2008137417 A2 | 11/2008 |
| WO | 2009114640 A2 | 9/2009 |
| WO | 2011099908 A1 | 8/2011 |
| WO | 2012084001 A1 | 6/2012 |
| WO | 2013004007 A1 | 1/2013 |

* cited by examiner

→ Link from Serving Cell
---→ Control Signaling Path
------ Backhaul between Cells

INTERFERENCE CANCELLATION METHODS USED IN BASE STATIONS AND USER EQUIPMENTS

TECHNICAL FIELD

The technology presented in this disclosure generally relates to radio communication networks. More particularly, the present disclosure relates to a method performed by a Base Station (BS) for facilitating Interference Cancellation (IC) at a User Equipment (UE), and an associated BS; and relates to a method in a UE for IC and an associated UE.

BACKGROUND

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

In the 3rd Generation Partnership Project (3GPP), Interference Cancellation (IC) has been widely discussed. In Rel-11, Cell-specific Reference Signal (CRS) Interference Cancellation (CRS-IC), Primary Synchronization Signal (PSS)/Secondary Synchronization Signal (SSS), Physical Broadcast Channel (PBCH) IC has been standardized for heterogeneous network and homogeneous network. In Rel-11, in order to enable CRS-IC, PSS/SSS, PBCH IC, eNodeB (eNB) needs to provide UE with certain assistance information, e.g., CRS ports, cell ID, and MBSFN configuration. UE utilizes such information to cancel interference on CRS, PSS/SSS, PBCH and the like. To enhance UE's performance, Physical Downlink Share Channel (PDSCH) and Physical Downlink Control CHannel (PDCCH)/enhance Physical Downlink Control CHannel (ePDCCH) IC are being under discussion in Rel-12.

For the current cooperation transmission, UE has no capability for PDSCH IC. Hence, all the current cooperation transmission schemes are trying to minimize the interference from the transmitter side. However, for advanced UE with interference capability, the traditional cooperation transmission scheme is not the optimized transmission scheme.

Regarding IC, especially PDSCH IC, the key issue is to enable the UE to estimate the interference properly with certain accuracy, so that after a cancellation of this estimated interference from the received signal, detection performance based on the new resulting signal of the cancellation may be improved. Hence, estimation of the interference has decisive role in this cancellation operation.

However, usually, a blind detection of the interference estimation is either infeasible due to the UE's limited capability or results in a low accuracy or robustness. To have a best tradeoff between the cost and performance, so-called network-assisted IC is necessary.

For network-assisted IC, different IC methods can be used. Two kinds of IC methods are extensively discussed. One is Symbol Level Interference Cancellation (SLIC), and the other is CodeWord level Interference Cancellation (CWIC). For SLIC, an interference signal is regenerated after demodulation and is further subtracted from the received signal. For CWIC, an interference signal is synthesized after channel decoding and is further subtracted from the received signal.

To facilitate IC at UE side, firstly, the network may timely provide the UE with information, such as reference signal pattern, reference signal sequence and so on, so that the UE can estimate channel status between any of interferers and the UE as long as these interferences are intended to be cancelled. Secondly, depending on the UE's capability, an interfering signal' structure such as modulation mode/feature (for instance, modulation order) may be needed to be known to the UE. The more information on this interference signal structure, the more efficiently for the UE to do IC.

In other words, network-assisted IC is preferably to provide information about the interferers, including:
  any information aiding the UE to infer interfering channel status; and
  interfering signal structure or features.

Owing to the existing multiple transmission (TX) modes, modulation levels, multiple antenna spatial beamforming, as well as dynamic scheduling, SU/MU TX style, shared-cell ID, and the like information about the interferes, an efficient solution of carrying out the network assistance is in demand.

SUMMARY

It is in view of the above considerations and others that the various embodiments of the present technology have been made.

According to a first aspect of the present disclosure, there is proposed a method performed by a BS for facilitating IC at a UE. The method includes predefining one or more sets of transmission parameters, where one or more of the transmission parameters in the one or more sets are constrained to take values from respective reduced sets of values out of the values available for the respective one or more transmission parameters, each set of the one or more sets of transmission parameters being identifiable by a unique indication. The method further includes configuring a transmission of the BS, which is to interfere downlink transmissions to the UE from a serving BS of the UE, by using one of the predefined one or more sets of transmission parameters.

Preferably, the method may further include determining one or more time-frequency resource units, each of which corresponds to at least one of the one or more sets of transmission parameters. The transmission of the BS occurs on the determined one or more time-frequency resource units.

According to a second aspect of the present disclosure, there is proposed a method in a UE for IC. The method includes identifying, by means of receiving an indication, a set of transmission parameters used by a BS to configure a transmissions of the BS, which is to interfere downlink transmissions to the UE from a serving BS of the UE. The identified set of transmission parameters is one out of one or more predefined sets of transmission parameters, where one or more of the transmission parameters in the one or more sets are constrained to take values from respective reduced sets of values out of the values available for the respective one or more transmission parameters. The indication uniquely indicates the identified set of transmission parameters among the one or more predefined sets of transmission parameters. The method further includes performing the IC by using the identified set of transmission parameters.

According to a third aspect of the present disclosure, there is proposed a BS for facilitating IC at a UE. The BS includes: a predefining unit configured to predefine one or more sets of transmission parameters, where one or more of the transmission parameters in the one or more sets are constrained to take values from respective reduced sets of values out of the values available for the respective one or more transmission parameters. Each set of the one or more sets of transmission parameters is identifiable by a unique indication. The BS further includes a configuring unit configured to configure a transmissions of the BS, which is to interfere downlink transmissions to the UE from a serving BS of the UE, by using the predefined one or more sets of transmission parameters.

According to a fourth aspect of the present disclosure, there is proposed a UE for IC. The UE includes an identifying unit configured to identify, by means of receiving an indication, a set of transmission parameters used by a BS to configure a transmissions of the BS, which is to interfere downlink transmissions to the UE from a serving BS of the UE. The identified set of transmission parameters is one out of one or more predefined sets of transmission parameters, where one or more of the transmission parameters in the one or more sets are constrained to take values from respective reduced sets of values out of the values available for the respective one or more transmission parameters. The indication uniquely indicates the identified set of transmission parameters among the one or more predefined sets of transmission parameters. The UE further includes an IC performing unit configured to perform the IC by using the identified set of transmission parameters.

Accordingly, the present disclosure may constrain the secondary transmissions by constraining one or more transmission parameters to take constrained values. Correspondingly, only indications corresponding to this part of transmission parameters have to be transmitted to the UE. Then, the UE can complete IC without having to identify all transmission parameters of the concerned secondary transmissions. This may reduce signaling while simplifying IC complexity at the UE side.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF EMBODIMENTS

Figure 1:
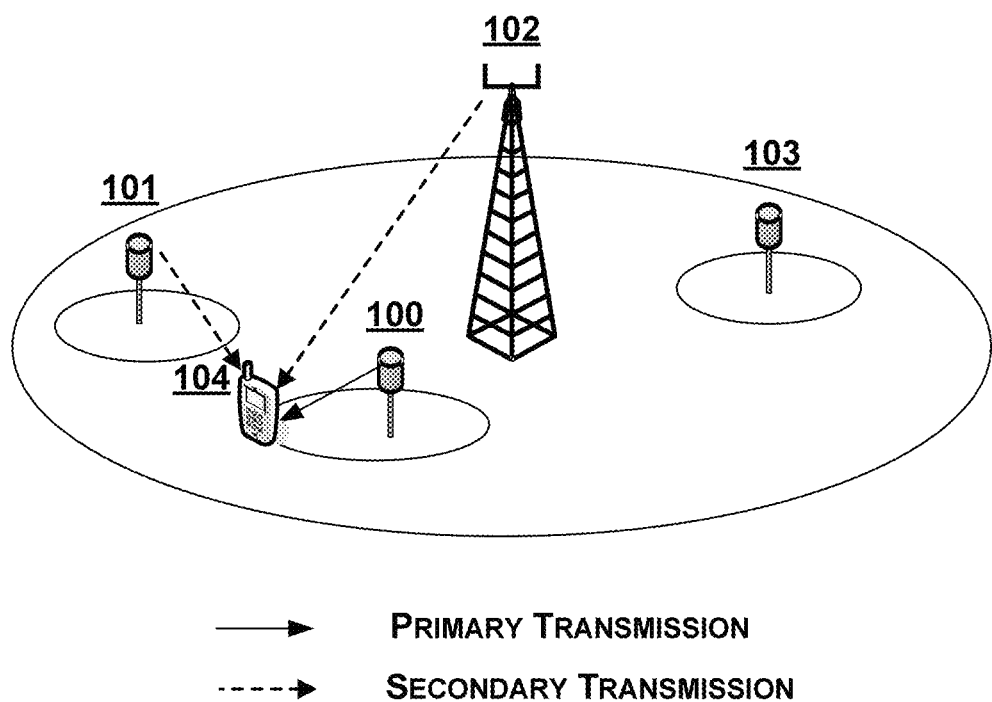
FIG. 1 conceptually illustrates a cooperation transmission scenario where the present disclosure may be applied.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the figures, can be arranged, substituted, combined, and designed in a wide variety of different configurations, all of which are explicitly contemplated and make part of this disclosure.

As used hereinafter, it should be appreciated the term UE may be referred to as a mobile terminal, a terminal, a user terminal (UT), a wireless terminal, a wireless communication device, a wireless transmit/receive unit (WTRU), a mobile phone, a cell phone, etc. Yet further, the term UE includes MTC (Machine Type Communication) devices, which do not necessarily involve human interaction. Also, the term "base station" as used herein may be referred to as a radio base station, a NodeB or an evolved NodeB (eNB), access point, relay node, et cetera.

Moreover, a TX point as used herein may be referred to as an eNB TX point, a CoMP point, a common cell ID sector TX Point, or a remote radio RRU TX point, which have connections to respective distant baseband units, or may be referred to as any pico/home eNB TX point or heterogeneous TX point.

FIG. 1 conceptually illustrates a cooperation transmission scenario where the present disclosure may be applied. As shown in FIG. 1, there are four BSs, denoted as BS 100, BS 101, BS 102, and BS 103, respectively, and one UE, denoted as UE 104. UE 104 is served by BS 100, BS 101 and BS 102 are of dominant aggressor cells (also referred to as interfering cells), and BS 103 is of a non-dominant aggressor cell. In other words, for UE 104, the transmission from BS 100 (denoted as solid lines) is desired transmission, and the remaining transmissions (denoted as broken lines) are intended for other UEs and thus act as interference for UE 104. Here, the desired transmission may be referred to as primary transmission, and the transmissions other than the desired transmission may be referred to as secondary transmission or interfering transmission.

In order to aid UE (e.g., UE 104) to cancel the interference, network assisted information shall be provided as interference information. With full interference information, UE can optimize decoding performance, but the signaling overhead is not affordable. In order to reduce the signaling overhead, the present disclosure proposes two new cooperation transmission schemes.

In the first cooperation transmission scheme, the secondary transmission is constrained into a limited transmission mode with some constrained transmission parameters.

In the second cooperation transmission scheme, one or more resource units are reserved from cooperation transmission points for the relevant UEs. Within the reserved resource units, the transmission is constrained into a limited transmission mode with some constrained transmission parameters.

The first scheme is more suitable for fast backhaul and the second scheme can be used for slow backhaul. For both schemes, signaling should be provided and designed for the UE about the constrained transmission. With the proposed cooperation transmission schemes, the signaling overhead may be reduced significantly.

Compared with CoMP (such as DPB), ICIC (such as Rel-8 Inter-Cell interference coordination (ICIC)), and (F)eICIC (Further enhanced ICIC), system average throughput is improved, and the cell-edge throughput is kept.

Figure 2:
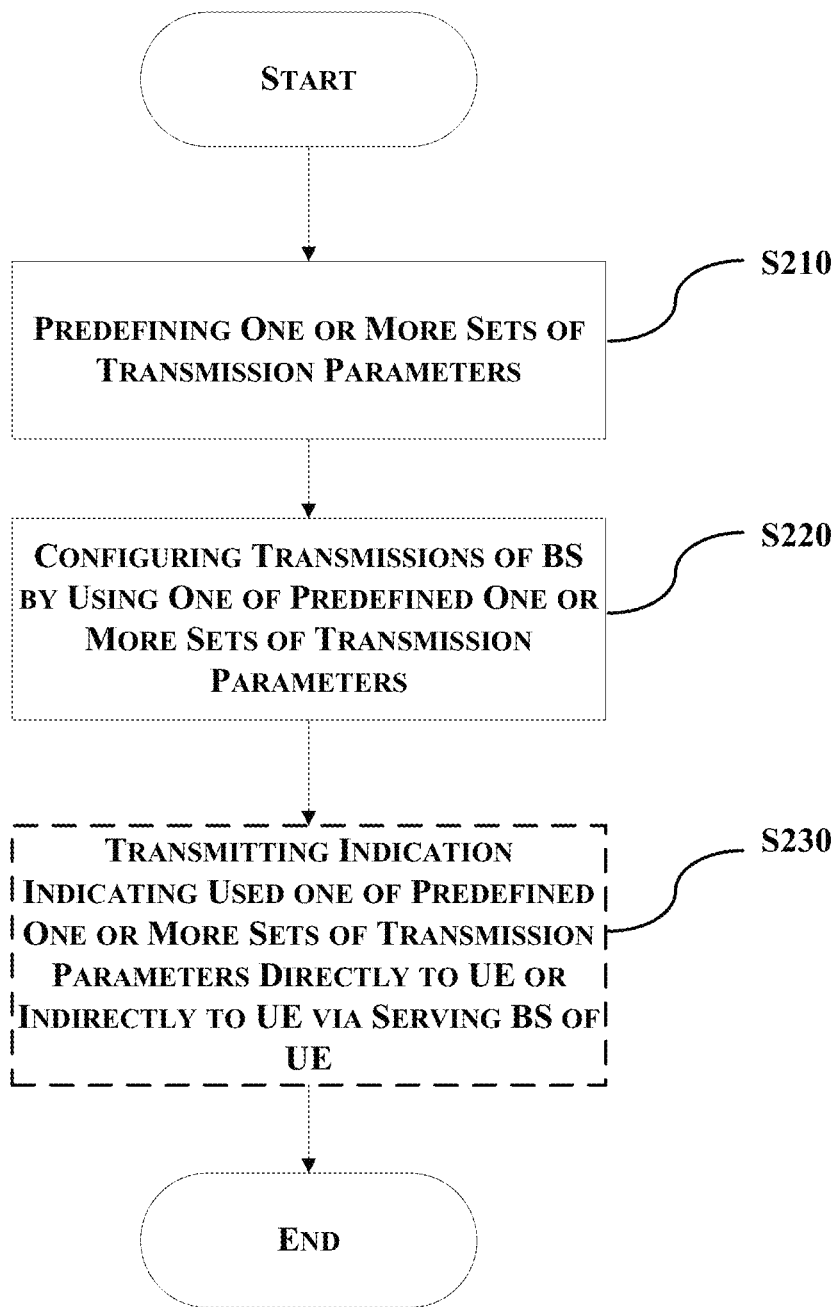
FIG. 2 shows a flowchart of a method 200 according to a first embodiment of the present disclosure.

FIG. 2 shows a flowchart of a method 200 according to a first embodiment of the present disclosure. The method 200 is performed by a BS, e.g., BS 101 or BS 102 in FIG. 1, for facilitating IC at a UE, e.g., UE 104 in FIG. 1. The BS and UE may be comprised in a cooperation transmission scenario such as that illustrated in FIG. 1.

At step S210, the BS predefines one or more sets of transmission parameters, where one or more of the transmission parameters in the one or more sets are constrained to take values from respective reduced sets of values out of the values available for the respective one or more transmission parameters. Each set of the one or more sets of transmission parameters is identifiable by a unique indication. For example, if the BS selects two sets of transmission parameters, one set may be indicated by 0 and the other set may be indicated by 1. Taking the scenario as shown in FIG. 1 as an example, BS 102 may predefine one or more sets of transmission parameters from all sets of transmission parameters available for BS 102 serving UEs located within its cell.

As an example, the one or more sets of transmission parameters may be only a part of the all sets of transmission parameters available for the BS serving its own served UEs.

At step S220, the BS configures a transmission of the BS, which is to interfere DL transmissions to the UE from a serving BS of the UE, by using one of the predefined one or more sets of transmission parameters. The DL transmissions from the UE's serving BS may refer to primary transmissions for the UE, while the BS's transmission here may refer to a secondary transmission for the UE.

Under the scenario of FIG. 1, BS 102 may configure its own one transmission, which is to interfere DL transmissions to UE 104 from BS 100, by using one of the predefined one or more sets of transmission parameters. For example, the BS may determine which of its own transmission is to interfere its neighbor BS's DL transmissions based on agreements among BSs.

As an example, the one or more sets of transmission parameters and corresponding indications are aware/known to the UE or to the serving BS of the UE.

The method 200 may further include an optional step S230. At step S230, the BS transmits an indication indicating the used one of the predefined one or more sets of transmission parameters directly to the UE or indirectly to the UE via the serving BS of the UE (not shown).

For example, the UE may have already known the one or more sets of transmission parameters and corresponding indications. In this case, when receiving the indication transmitted at step S230, the UE may identify corresponding transmission parameters used by the secondary transmission. That is, only few bits are needed for UE to know the transmission parameters of the secondary transmission. This may reduce the signaling overhead. With the identified transmission parameters, the UE may perform IC without having to blind-estimate these parameters. Thereby, IC complexity at the UE may be reduced.

Figure 3:
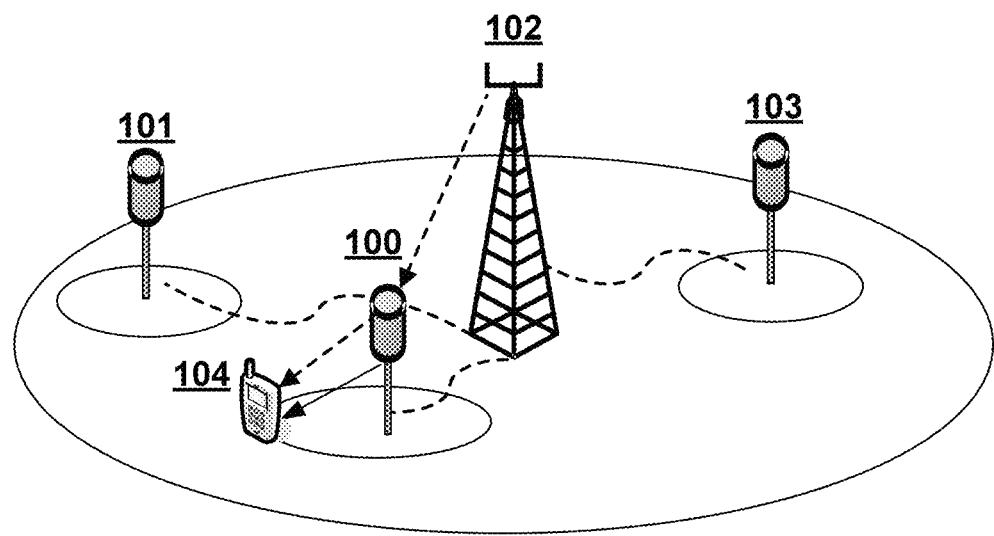
FIG. 3 illustrates example signaling of the indication in the cooperation transmission scenario of FIG. 1.

FIG. 3 illustrates example signaling of the indication in the cooperation transmission scenario of FIG. 1.

As shown in FIG. 3, in order to enable IC at UE 104, transmission parameters of BS 102 are communicated to BS 100 through fast backhaul between BS 102 and BS 100. Then, BS 100 usually transmits scheduling information for the UE through (e)PDCCH. At the same time, BS 100 also forwards the transmission parameters of BS 102 to UE 104 through, e.g., Radio Resource Control (RRC) signaling or (e)PDCCH signaling.

Moreover, the indication may be signaled via RRC, and/or MAC, and/or physical channels. It can be broadcasted, or group casted or unicasted to UEs in the system. In case there are multiple possible said sets for the constrained transmission, dynamic signaling can be introduced to the selection of constrained sets. The dynamic signaling can be done via (e)PDCCH or other control channels.

In accordance with the first embodiment, each of the one or more sets of transmission parameters may include one or more of:

Modulation, such as modulation constellation;
Number of spatial data streams;
For CWIC, the following parameters are relevant:
   Data scrambling sequence;
   Coding rate;
   Interleaving style;
   Transmission block size;
   Redundancy version (RV);
Transmission mode:
   For example, the primary and secondary transmission use the same transmission mode;
CW selection:
   For example, only one codeword may be used;
Antenna ports:
   For example, at most two antenna ports are used;
Identity used for reference sequence generation:
   For example, preselect some scrambling identity;
Transmitted signal strength relevant information such as traffic to pilot ratio (TPR) for PDSCH channels;
Transmission point information for the secondary transmission:
   For example, the information may include cell id which is corresponding to the cell which performs the secondary transmission;
   For example, the information may include whether the primary transmission and the secondary transmission from the same transmission point, co-site or not.

The above examples are just illustrative. The present disclosure is not limited to these parameters, but may be applied to any other appropriate parameters.

As a further example, the secondary transmission may be blanked. This is equivalent to fall back to Dynamic Point Blanking (DPB), detailed description thereof will be omitted here.

Moreover, the primary transmission for one UE can be the secondary transmission of other UE. In this case, both primary transmission and secondary transmission may be constrained.

When the secondary transmission mainly comprises interference due to multiple-user scheduling of transmission (TX) point by a multiple antenna spatial beamforming operation, less information is needed. In such a case, the beamforming vector (in format of beamforming (BF) matrix index in case of codebook based BF) and stream number of the TX to other UEs sharing same resource is needed for the UE of interest. The operations at MU-MIMO cases may be extendable to common cell ID multiple TX point cooperation cases.

In accordance with the first embodiment of the present disclosure, only a part of available transmission parameters (not all) may be used for the secondary transmissions. Correspondingly, only indications corresponding to this part of transmission parameters have to be transmitted to the UE. Then, the UE can complete IC without having to identify all transmission parameters of the concerned secondary transmissions. This may reduce signaling while simplifying IC complexity at the UE side.

Figure 4:
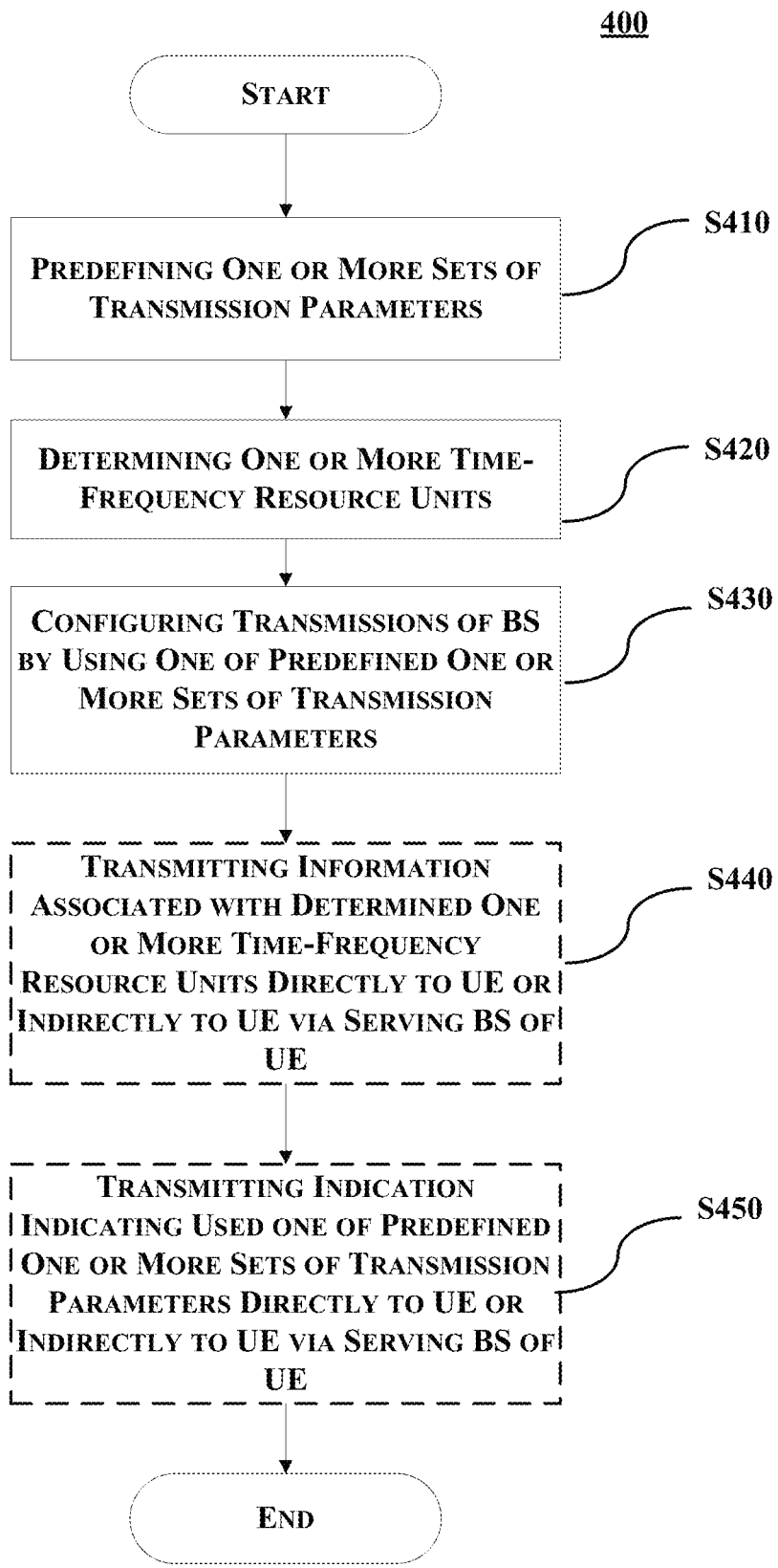
FIG. 4 shows a flowchart of a method 400 according to a second embodiment of the present disclosure.

FIG. 4 shows a flowchart of a method 400 according to a second embodiment of the present disclosure. The method 400 is performed by a BS, e.g., BS 101 or BS 102 in FIG. 1, for facilitating IC at a UE, e.g., UE 104 in FIG. 1. The BS and UE may be comprised in a cooperation transmission scenario such as that illustrated in FIG. 1.

The method 400 comprises steps S410, S420, S430, S440, and S450. The steps S410, S430 and S450 are equivalent to the steps S210, S220 and S230, respectively, thus detailed explanations will be omitted for conciseness. In understanding the method 400, the above descriptions on the steps S210, S220 and S230 may be properly incorporated. Although the step S440 is illustrated as occurring before the step S450, the step S440 may be also performed following the step S450 or these two steps may be performed simultaneously.

At step S420, the UE determines one or more time-frequency resource units, each of which corresponds to at least one of the one or more sets of transmission parameters (not shown). The transmission of the BS occurs on the determined one or more time-frequency resource units.

In this embodiment, one or more time-frequency resource units are reserved both in serving cell and interference cell(s) and may be generally denoted as a NAIC zone. Within each NAIC zone, for each interfering TX point, one or more set of constrained transmission parameters may be predefined and expected to be observed by the interfering TX points. For example, the transmission parameters may include transmission mode, the start position of scheduled PRBs, the number of allocated PRBs, the number of codewords, antenna port(s), scrambling identity, number of layers and identity used for reference sequence generation, etc. At least one set of transmission parameters may be constrained to predefined values within the set.

Figure 5:
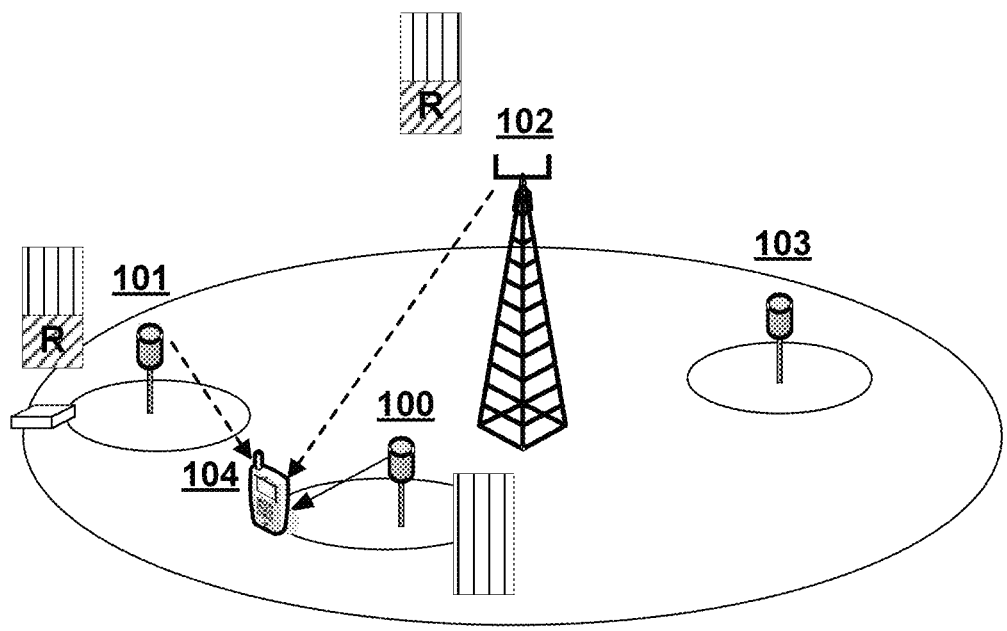
FIG. 5 shows an illustrative implementation of the second embodiment in the scenario of FIG. 1.

FIG. 5 shows an illustrative implementation of the second embodiment in the scenario of FIG. 1.

As shown in FIG. 5, BS 101 and BS 102 can reserve some resource units, denoted by "R". In the "R" part, only some constrained sets of transmission parameters may be used.

As one example of the NAIC zone, it can be partitioned either in time domain or in frequency domain. Moreover, the NAIC zone may be either distributed or localized. For example, the NAIC zone may be one or a plurality of PRB, PRG, band, or resource partition, etc.

Figure 6:
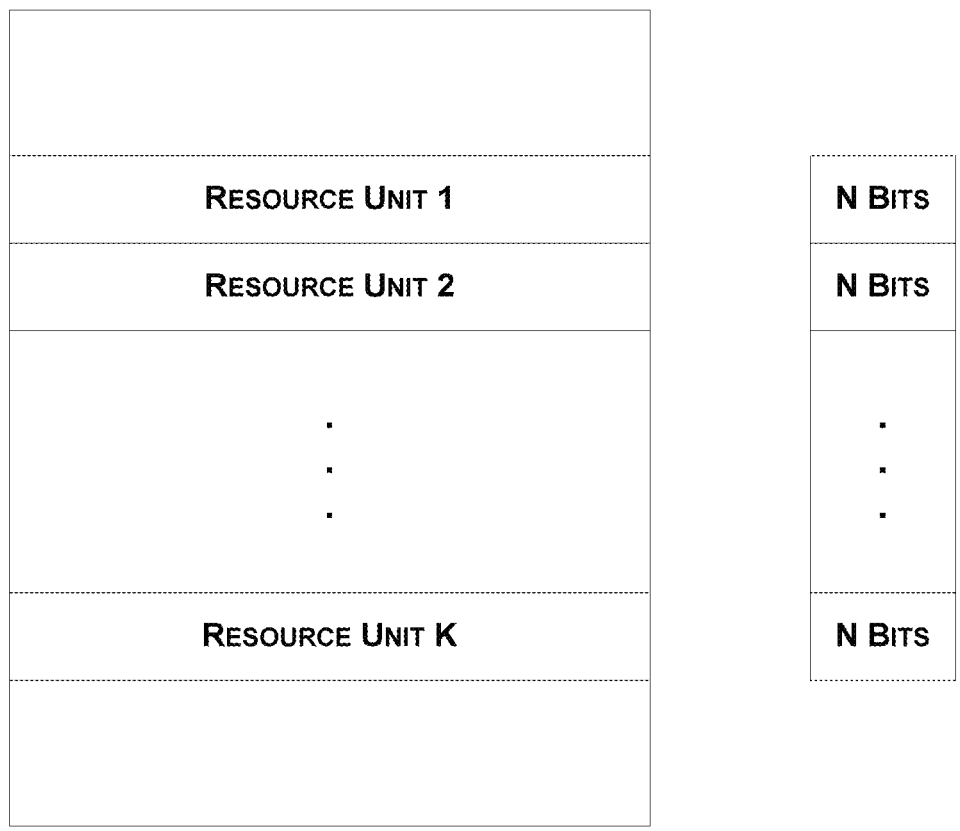
FIG. 6 illustrates a signaling design for a NAIC zone.

FIG. 6 illustrates a signaling design for a NAIC zone. As shown in FIG. 6, the NAIC zone may be partitioned into K resource units. For each resource unit, N bits may be used to indicate which set of transmission parameters is used for that resource unit.

Figure 7:
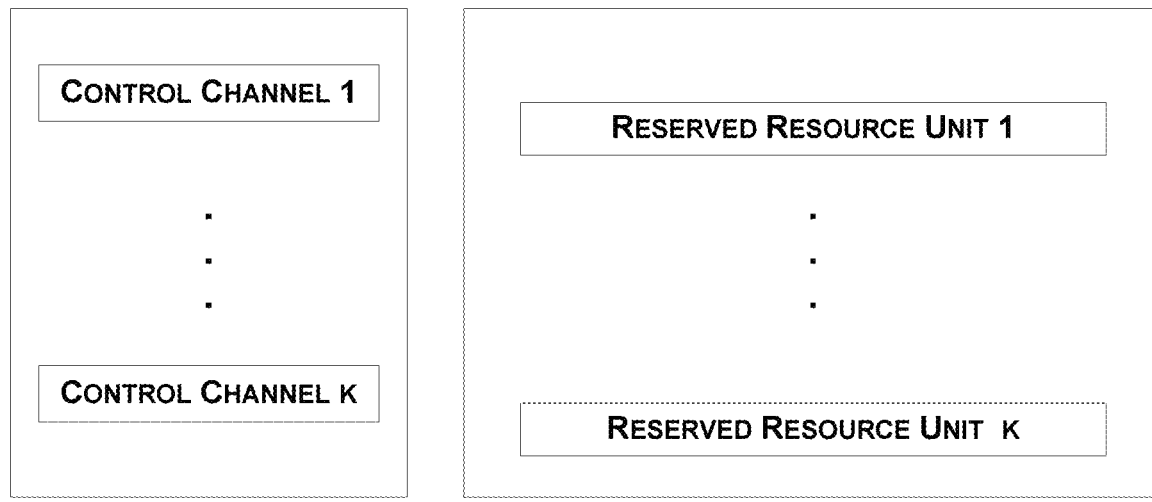
FIG. 7 illustrates correspondence between control channels and resource units.

FIG. 7 illustrates correspondence between control channels and resource units. As shown in FIG. 7, one control channel is mapped to each resource unit. Then, in each control channel, one or more indications corresponding to one or corresponding sets of transmission parameters may be carried. For example, the control channel can be (e)PDCCH.

Different control channels may have different search spaces. A search space can be predefined. When a UE is scheduled, the UE only needs to detect the (e)PDCCH related to its scheduled resource. Alternatively, different control channels may use different RNTIs (Radio Network Temporary Identifiers) or other mechanism to differentiate the (e)PDCCH for each reserved resource unit.

As another example, the control channel carrying interference cancellation related information is not always transmitted at the serving BS, so it may not be guaranteed that UE could always successfully decode the control information. From UE's perspective, interference cancellation can be performed in a best effort manner. Upon successfully decoding the control information, the UE could adopt detection algorithms with interference cancellation based on the acquired information. Otherwise, the UE adaptively falls back to choose detection algorithms without inter-cell interference cancellation.

Now, return to FIG. 4. At step S440, the BS transmits information associated with the determined one or more time-frequency resource units directly to the UE or indirectly to the UE via the serving BS of the UE (not shown).

For example, the information associated with the determined one or more time-frequency resource units may be signaled to the UE together with the indication indicating the set of transmission parameters and association between the NAIC zone and the set. Based on the signaled information, the UE can decide interference characteristic associated with the allocated resource units, and further mitigates the interference.

In an example of this embodiment, information associated with transmissions may be exchanged between serving cell and interference cells.

Figure 8:
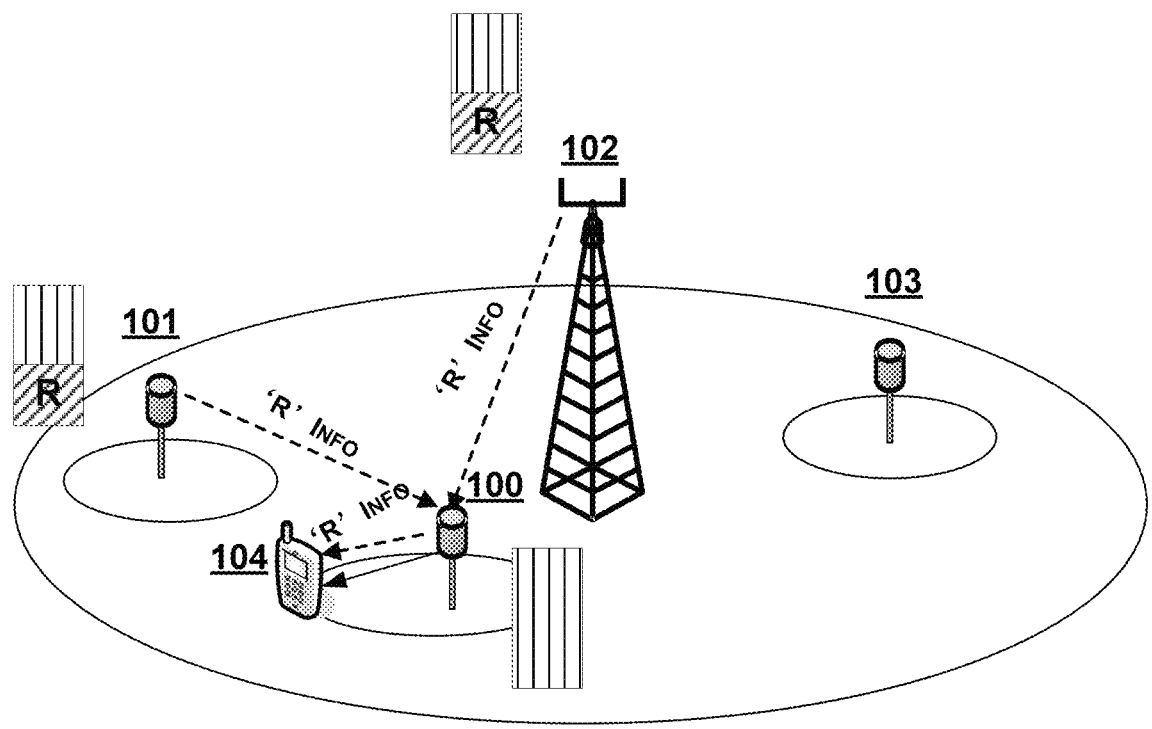
FIG. 8 illustrates example signaling of the information associated with the determined one or more time-frequency resource units in the cooperation transmission scenario of FIG. 1.

FIG. 8 illustrates example signaling of the information associated with the determined one or more time-frequency resource units in the cooperation transmission scenario of FIG. 1.

As shown in FIG. 8, BS 101 and BS 102 both transmit the information associated with the determined one or more time-frequency resource units (denoted as 'R' info in FIG. 8) to BS 100, which then forwards the information to UE 104.

Figure 9:
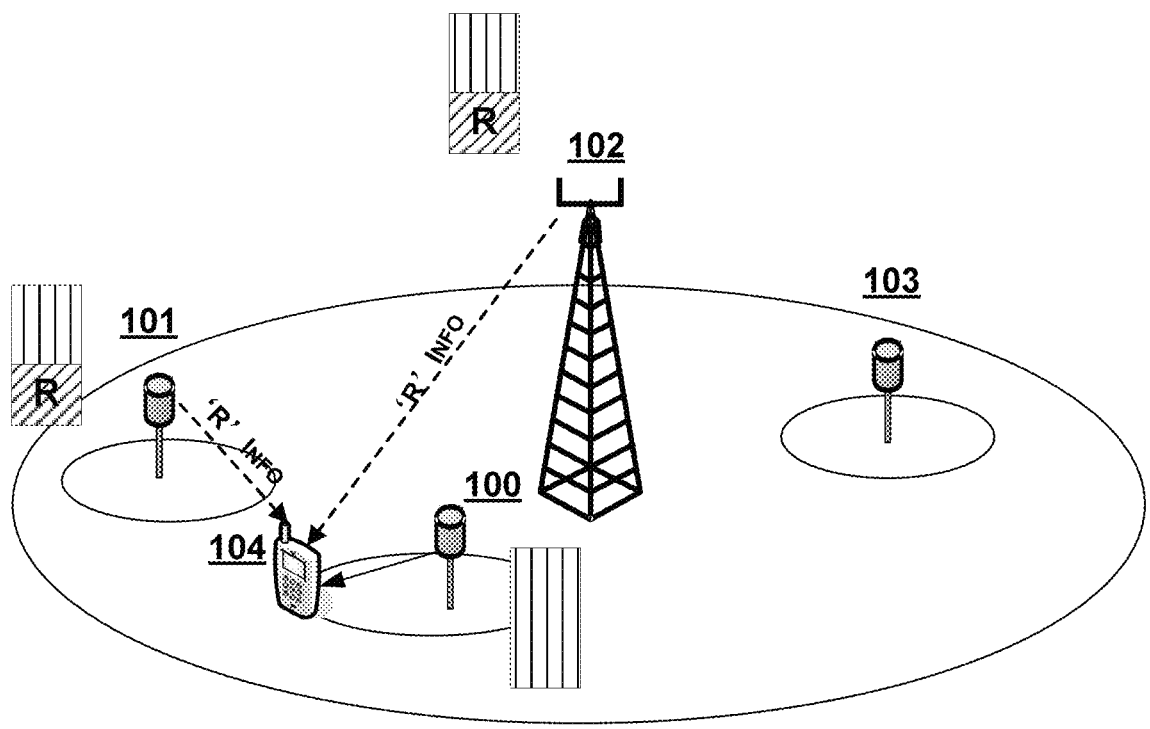
FIG. 9 illustrates another example signaling of the information associated with the determined one or more time-frequency resource units in the cooperation transmission scenario of FIG. 1.

FIG. 9 illustrates another example signaling of the information associated with the determined one or more time-frequency resource units in the cooperation transmission scenario of FIG. 1.

As shown in FIG. 9, BS 101 and BS 102 both transmit the information associated with the determined one or more time-frequency resource units (denoted as 'R' info in FIG. 9) directly to UE 104.

For the reserved resource units, the transmission parameters for the interfering TX point may be predefined as:
  Transmission mode:
    For example, in case CRS-based transmission mode is used, in the reserved resource zone, TM2 or TM3 may be used in the reserved resource when the number of antenna ports is large, such as 4 or 8;
    For example, in case DMRS-based transmission mode, in the reserved resource, TM10 may be used;
  CW selection:
    For example, in the reserved resource, one codeword may be used;

Scheduling restriction:
  For example, the start position of the allocation may be with integer multiple of an integer. As an alternative, the allocation can be aligned with the PRG, or band or resource partition;
Antenna ports:
  For example, at most two antenna ports are used in the reserved resource;
Scrambling identity:
  For example, pre-specified scrambling identity;
Identity used for reference sequence generation:
  For example, pre-select some scrambling identity.

As one example of the embodiment, the set of transmission parameters may be predefined as default values. Only the parameters in the predefined set may be used for configuring transmissions of the neighbor cells in the reserved resource units.

As another example of the embodiment, the set of transmission parameters may be associated with one reserved resource unit. As an alternative, the set transmission parameter may be associated with multiple reserved resource units.

In the second embodiment, the present disclosure may further limit a range, where only a part of transmission parameters (not all) may be used for the secondary transmissions, as compared to the first embodiment. Specifically, some time-frequency resource units are specified, where the secondary transmission is constrained with certain constrained transmission parameters. This may further reduce signaling.

Figure 10:
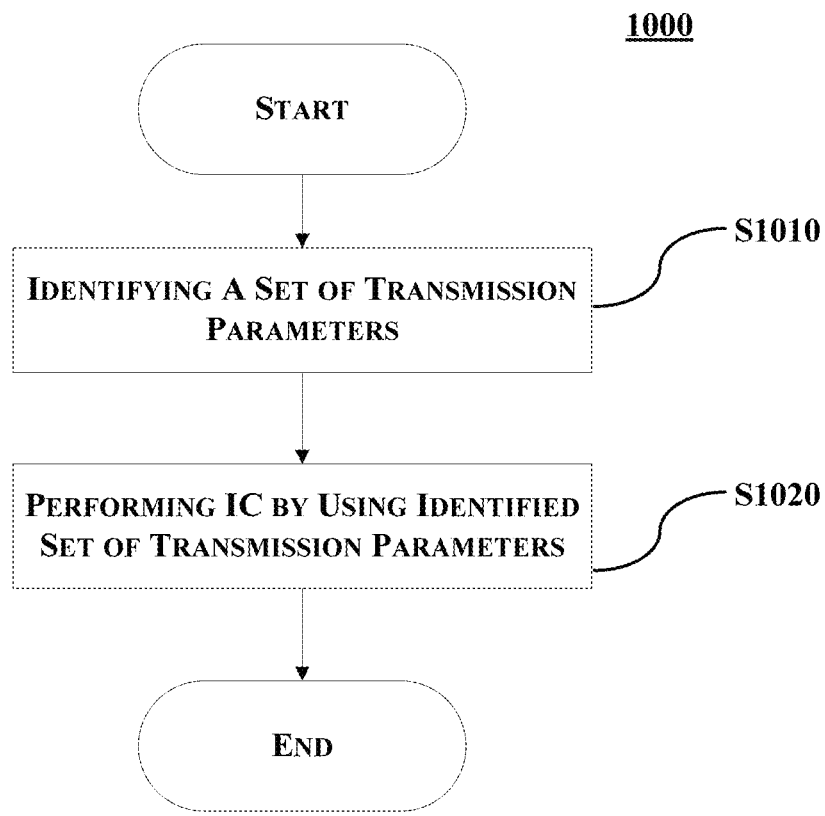
FIG. 10 shows a flowchart of a method 1000 according to some embodiments of the present disclosure.

FIG. 10 shows a flowchart of a method 1000 according to some embodiments of the present disclosure. The method 1000 is performed in a UE, e.g., UE 104 in FIG. 1, for IC.

At step S1010, the UE identifies identifying, by means of receiving an indication, a set of transmission parameters used by a BS to configure a transmissions of the BS, which is to interfere downlink transmissions to the UE from a serving BS of the UE. The identified set of transmission parameters is one out of one or more predefined sets of transmission parameters, where one or more of the transmission parameters in the one or more sets are constrained to take values from respective reduced sets of values out of the values available for the respective one or more transmission parameters. The indication uniquely indicates the identified set of transmission parameters among the one or more predefined sets of transmission parameters. Taking the scenario as shown in FIG. 1 as an example, UE 104 may identify a set of transmission parameters used by BS 102 to configure a transmission of BS 102. In this case, the one or more sets of transmission parameters may be predefined from all sets of transmission parameters available for BS 102 serving UEs located within its cell.

As an example, the one or more sets of transmission parameters may belong to a subset of the all sets of transmission parameters available for the BS serving its own served UEs.

At step S1020, the UE performs the IC by using the identified set of transmission parameters. For example, the UE may use the indentified set of transmission parameters to perform the IC in accordance with the existing IC technologies, such as NAIC, CRS-IC, CRS-IM, etc.

As an example, the one or more sets of transmission parameters and corresponding indications are aware/known to the UE. Alternatively, the one or more sets of transmission parameters and corresponding indications are aware/known to the serving BS of the UE, which forward them to the UE.

With the constrained transmission, only few bits are needed for UE to know the interference structure and the interference channel state information. With this information, UE does not necessary to blind estimate these parameters any more. This may reduce IC complexity at the UE side.

The method 1000 may further include a step of receiving information associated with one or more time-frequency resource units, each of which corresponds to at least one of the one or more sets of transmission parameters (not shown). The transmission of the BS occurs on the determined one or more time-frequency resource units. In this example, the information associated with one or more time-frequency resource units may be received directly from the BS or indirectly from the BS via the serving BS of the UE.

In this case, the present disclosure further limits a range, where only a part of transmission parameters (not all) may be used for the secondary transmissions. That is, some time-frequency resource units are specified, where the secondary transmission is constrained with certain constrained transmission parameters. This may further reduce signaling.

Step S1010 may further include a step of receiving the indication directly from the BS or indirectly from the BS via the serving BS of the UE (not shown).

Figure 11:
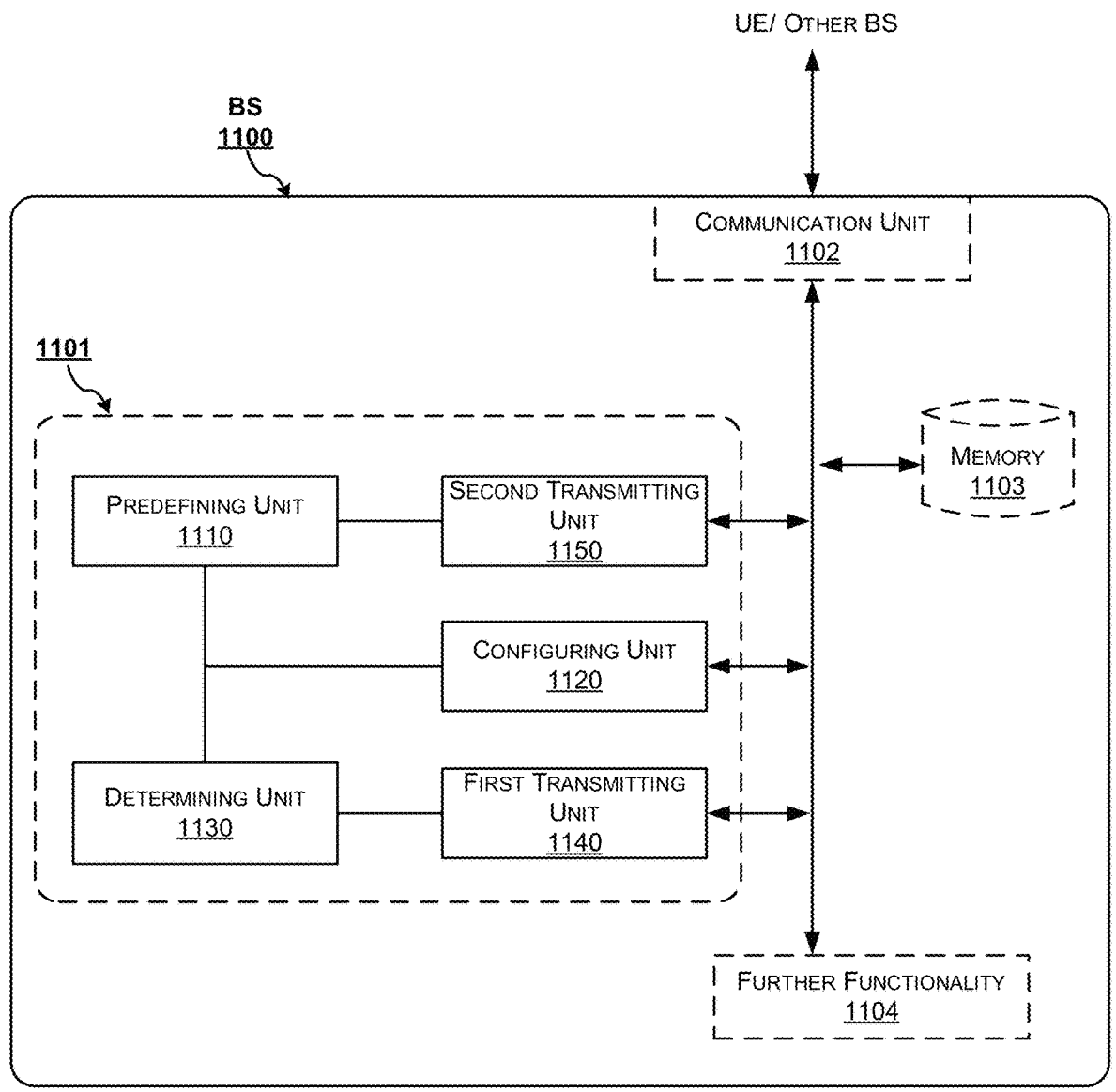
FIG. 11 is a schematic block diagram of BS 1100 according to some embodiments of the present disclosure.

FIG. 11 is a schematic block diagram of BS 1100 according to some embodiments of the present disclosure. The BS 1100 is used for facilitating IC at a UE.

The part of BS 1100 which is most affected by the adaptation to the herein described method is illustrated as an arrangement 1101, surrounded by a dashed line. The BS 1100 could be e.g. an eNB, or a NodeB, depending on in which type of communication system it is operable, e.g., LTE-type systems. The BS 1100 and arrangement 1101 are further configured to communicate with other entities via a communication unit 1102 which may be regarded as part of the arrangement 1101. The communication unit 1102 comprises means for wireless communication, and may comprise means for, e.g., wired communication. The arrangement 1101 or BS 1100 may further comprise other functional units 1104, such as functional units providing regular eNB functions, and may further comprise one or more storage units 1103.

The arrangement 1101 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 2 or 4. The arrangement part of the BS 1100 may be implemented and/or described as follows.

Referring to FIG. 11, BS 1100 may include a predefining unit 1110 and a configuring unit 1120.

The predefining unit 1110 may predefine one or more sets of transmission parameters, where one or more of the transmission parameters in the one or more sets are constrained to take values from respective reduced sets of values out of the values available for the respective one or more transmission parameters. Each set of the one or more sets of transmission parameters may be identifiable by a unique indication.

The configuring unit 1120 may configure a transmissions of the BS, which is to interfere downlink transmissions to the UE from a serving BS of the UE, by using the predefined one or more sets of transmission parameters.

The BS 1100 may further include a determining unit 1130.

The determining unit 1130 may determine one or more time-frequency resource units, each of which corresponds to at least one of the one or more sets of transmission parameters. In this case, the transmission of the BS occurs on the determined one or more time-frequency resource units.

The BS 1100 may further include a first transmitting unit 1140. The first transmitting unit 1140 may transmit information associated with the determined one or more time-frequency resource units directly to the UE or indirectly to the UE via the serving BS of the UE.

The BS 1100 may further include a second transmitting unit 1150. The second transmitting unit 1150 may transmit an indication indicating the used one of the predefined one or more sets of transmission parameters directly to the UE or indirectly to the UE via the serving BS of the UE.

As an example, the predefined one or more sets of transmission parameters and corresponding indications may be aware/known to the UE or to the serving BS of the UE.

For example, each of the one or more sets of transmission parameters may include one or more of:
 modulation order;
 number of spatial data streams;
 data scrambling sequence;
 coding rate;
 interleaving;
 transmission block size;
 redundancy version;
 transmission mode;
 code word selection;
 antenna ports;
 identity used for reference sequence generation;
 transmitted signal strength; and
 transmission point information for the transmissions.

It should be noted that two or more different units in this disclosure may be logically or physically combined. For example, the first transmitting unit 1140 and the second transmitting unit 1150 may be combined as one single unit.

Figure 12:
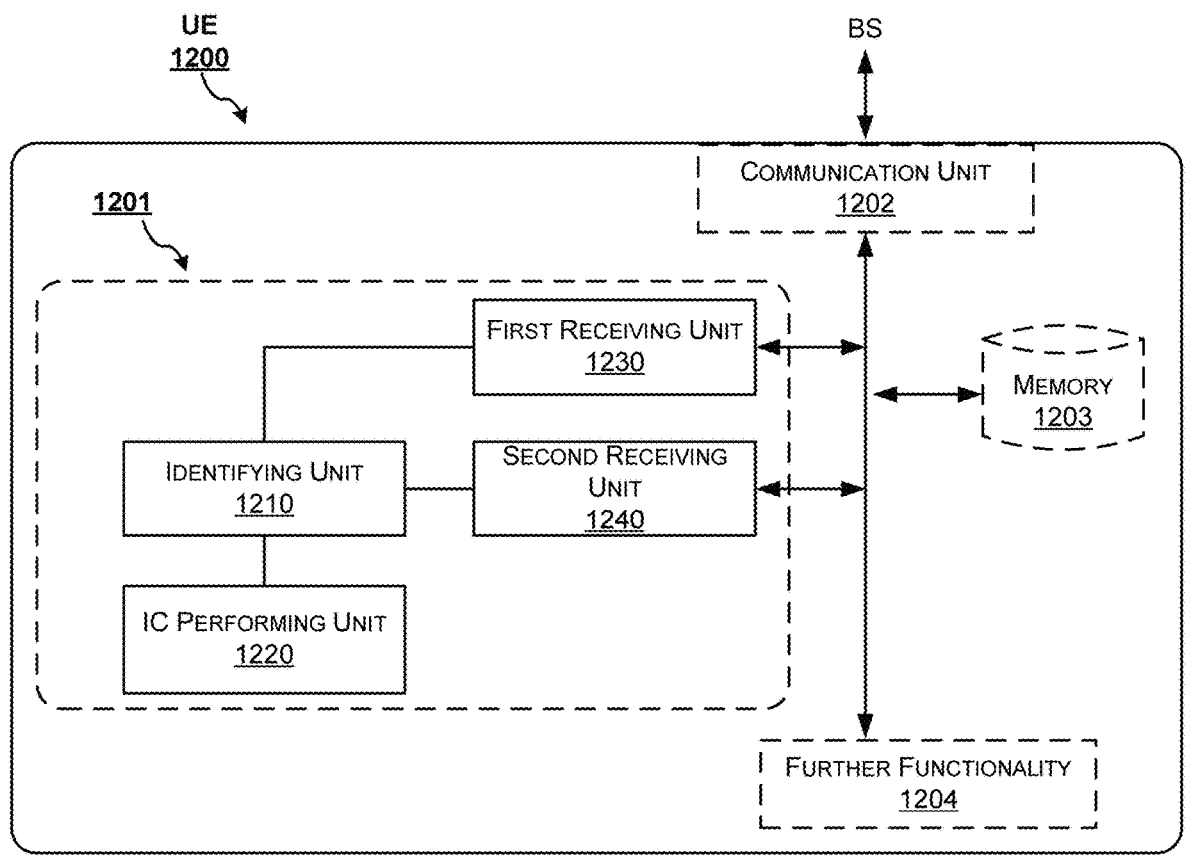
FIG. 12 is a schematic block diagram of UE 1200 according to some embodiments of the present disclosure.

FIG. 12 is a schematic block diagram of UE 1200 for IC according to some embodiments of the present disclosure.

The part of UE 1200 which is most affected by the adaptation to the herein described method, e.g., the method 1000, is illustrated as an arrangement 1201, surrounded by a dashed line. The UE 1200 could be e.g. a mobile terminal, depending on in which type of communication system it is operable, e.g., LTE-type systems. The UE 1200 and arrangement 1201 are further configured to communicate with other entities via a communication unit 1202 which may be regarded as part of the arrangement 1201. The communication unit 1202 comprises means for wireless communication. The arrangement 1201 or UE 1200 may further comprise other functional units 1204, such as functional units providing regular UE functions, and may further comprise one or more storage units 1203.

The arrangement 1201 could be implemented, e.g., by one or more of: a processor or a micro processor and adequate software and memory for storing of the software, a Programmable Logic Device (PLD) or other electronic component(s) or processing circuitry configured to perform the actions described above, and illustrated, e.g., in FIG. 10. The arrangement part of the UE 1200 may be implemented and/or described as follows.

Referring to FIG. 12, UE 1200 may include an identifying unit 1210 and an IC performing unit 1220.

The identifying unit 1210 may identify, by means of receiving an indication, a set of transmission parameters used by a BS to configure a transmissions of the BS, which is to interfere downlink transmissions to the UE from a serving BS of the UE. The identified set of transmission parameters is one out of one or more predefined sets of transmission parameters, where one or more of the transmission parameters in the one or more sets are constrained to take values from respective reduced sets of values out of the values available for the respective one or more transmission parameters. The indication uniquely indicates the identified set of transmission parameters among the one or more predefined sets of transmission parameters.

The IC performing unit 1220 may perform the IC by using the identified set of transmission parameters.

The UE 1200 may further include a first receiving unit 1230. The first receiving unit 1230 may receive information associated with one or more time-frequency resource units, each of which corresponds to at least one of the one or more sets of transmission parameters. In this case, the transmission of the BS occurs on the determined one or more time-frequency resource units.

The first receiving unit 1230 may further receive the information directly from the BS or indirectly from the BS via the serving BS of the UE.

The UE 1200 may further include a second receiving unit 1240. The second receiving unit 1240 may receive the indication directly from the BS or indirectly from the BS via the serving BS of the UE.

As an example, the one or more sets of transmission parameters and corresponding indications may be aware/known to the UE. Alternatively, the one or more sets of transmission parameters and corresponding indications may be aware/known to the serving BS of the UE, and may be received by the UE from the serving BS of the UE.

For example, each of the one or more sets of transmission parameters may include one or more of:
 modulation order;
 number of spatial data streams;
 data scrambling sequence;
 coding rate;
 interleaving;
 transmission block size;
 redundancy version;
 transmission mode;
 code word selection;
 antenna ports;
 identity used for reference sequence generation;
 transmitted signal strength; and
 transmission point information for the transmissions.

It should be noted that two or more different units in this disclosure may be logically or physically combined. For example, the first receiving unit 1230 and the second receiving unit 1240 may be combined as one single unit.

Figure 13:
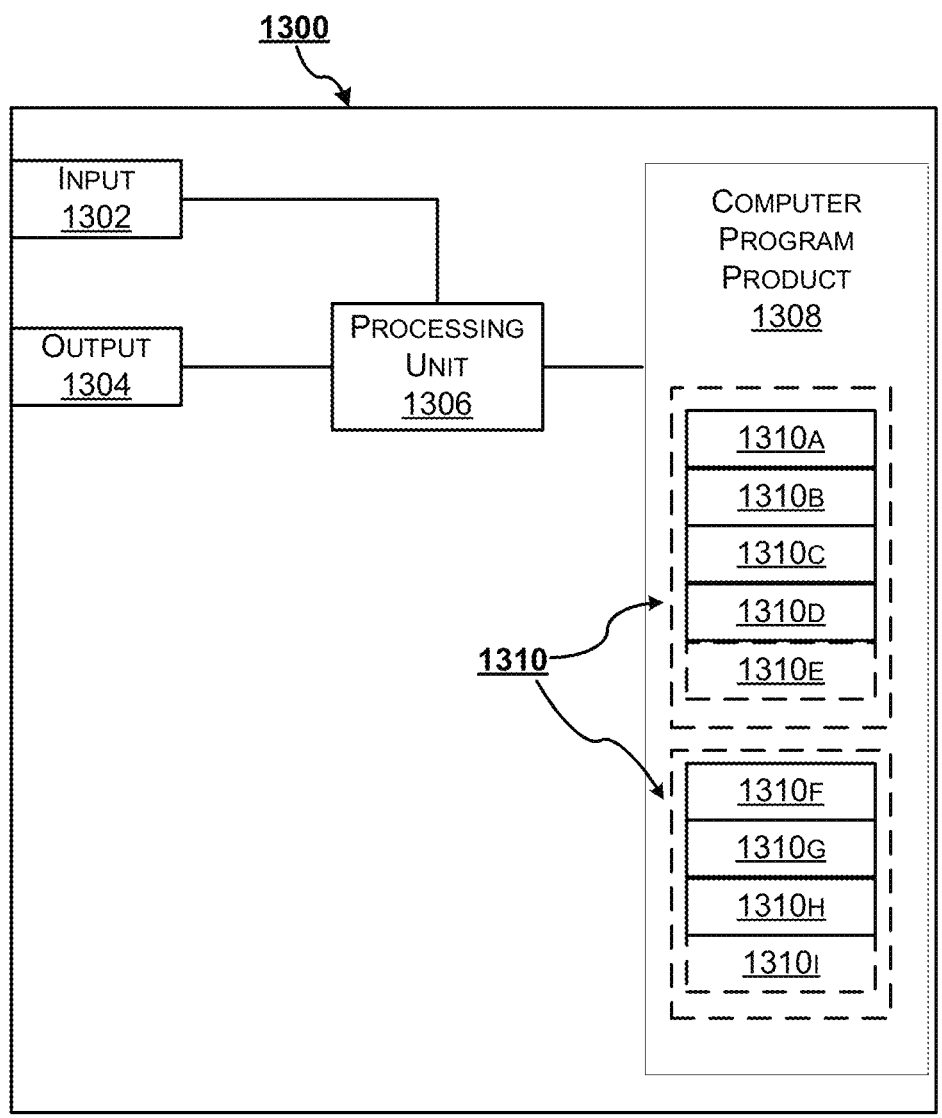
FIG. 13 schematically shows an embodiment of an arrangement 1300 which may be used in the BS 1100 or the UE 1200.

FIG. 13 schematically shows an embodiment of an arrangement 1300 which may be used in the BS 1100 or the UE 1200. Comprised in the arrangement 1300 are here a processing unit 1306, e.g., with a Digital Signal Processor (DSP). The processing unit 1306 may be a single unit or a plurality of units to perform different actions of procedures described herein. The arrangement 1300 may also comprise an input unit 1302 for receiving signals from other entities, and an output unit 1304 for providing signal(s) to other entities. The input unit and the output unit may be arranged as an integrated entity or as illustrated in the example of FIG. 11 or FIG. 12.

Furthermore, the arrangement 1300 comprises at least one computer program product 1308 in the form of a non-volatile or volatile memory, e.g., an Electrically Erasable Programmable Read-Only Memory (EEPROM), a flash memory and a hard drive. The computer program product 1308 comprises a computer program 1310, which comprises code/computer readable instructions, which when executed by the processing unit 1306 in the arrangement 1300 causes the arrangement 1300 and/or the BS or the UE in which it is comprised to perform the actions, e.g., of the procedure described earlier in conjunction with FIGS. 2 and 4 or FIG. 10.

The computer program 1310 may be configured as a computer program code structured in computer program modules 1310A-1310E or 1310F-1310I.

Hence, in an exemplifying embodiment when the arrangement 1300 is used in the BS 1100, the code in the computer program of the arrangement 1300 includes a selecting module 1310A for predefining one or more sets of transmission parameters, where one or more of the transmission parameters in the one or more sets are constrained to take values from respective reduced sets of values out of the values available for the respective one or more transmission parameters, each set of the one or more sets of transmission parameters being identifiable by a unique indication. The code in the computer program 1310 further includes a configuring module 1310B, for configuring a transmissions of the BS, which is to interfere downlink transmissions to the UE from a serving BS of the UE, by using the predefined one or more sets of transmission parameters. The code in the computer program 1310 may further include a determining module 1310C, for determining one or more time-frequency resource units, each of which corresponds to at least one of the one or more sets of transmission parameters. The code in the computer program 1310 may further include a transmitting module 1310D, for transmitting information associated with one or more time-frequency resource units and/or an indication indicating the used one of the predefined one or more sets of transmission parameters to the UE. The code in the computer program 1310 may comprise further modules, illustrated as module 1310E, e.g. for controlling and performing other related procedures associated with BS's operations.

In another exemplifying embodiment when the arrangement 1300 is used in the UE 1200, the code in the computer program of the arrangement 1300 includes an identifying module 1310F for identifying, by means of receiving an indication, a set of transmission parameters used by a BS to configure a transmissions of the BS, which is to interfere downlink transmissions to the UE from a serving BS of the UE, the identified set of transmission parameters being one out of one or more predefined sets of transmission parameters, where one or more of the transmission parameters in the one or more sets are constrained to take values from respective reduced sets of values out of the values available for the respective one or more transmission parameters, wherein the indication uniquely indicates the identified set of transmission parameters among the one or more predefined sets of transmission parameters. The code in the computer program 1310 further includes an IC performing module 1310G, for performing the IC by using the identified set of transmission parameters. The code in the computer program 1310 may further include a receiving module 1310H, for receiving information associated with one or more time-frequency resource units and/or the indication from the BS. The code in the computer program 1310 may comprise further modules, illustrated as module 1310I, e.g. for controlling and performing other related procedures associated with UE's operations.

The computer program modules could essentially perform the actions of the flow illustrated in FIG. 2 or 4, to emulate the arrangement 1101 in the BS 1100, or the actions of the flow illustrated in FIG. 10, to emulate the arrangement 1201 in the UE 1200. In other words, when the different computer program modules are executed in the processing unit 1306, they may correspond, e.g., to the units 1110-1150 of FIG. 11 or to the units 1210-1240 of FIG. 12.

Although the code means in the embodiments disclosed above in conjunction with FIG. 13 are implemented as computer program modules which when executed in the processing unit causes the device to perform the actions described above in conjunction with the figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories within the BS.

Although the present technology has been described above with reference to specific embodiments, it is not intended to be limited to the specific form set forth herein. For example, the embodiments presented herein are not limited to cooperation transmission; rather they are equally applicable to other appropriate transmission scenarios. The technology is limited only by the accompanying claims and other embodiments than the specific above are equally possible within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality. Finally, reference signs in the claims are provided merely as a clarifying example and should not be construed as limiting the scope of the claims in any way.

What is claimed is:

1. A method performed by a base station (BS) for facilitating interference cancellation (IC) at a user equipment (UE), the method comprising:
   predefining one or more sets of transmission parameters, where one or more of the transmission parameters in the one or more sets are constrained to take values from respective reduced sets of values out of the values available for the respective one or more transmission parameters, each set of the one or more sets of transmission parameters being identifiable by a unique indication;
   configuring a transmission of the BS, which is to interfere with downlink transmissions to the UE from a serving BS of the UE, by using one of the predefined one or more sets of transmission parameters; and
   sending an indication indicating the used one of the of the predefined one or more sets of transmission parameters to the UE.

2. The method of claim 1, further comprising:
determining one or more time-frequency resource units, each of which corresponds to at least one of the one or more sets of transmission parameters,
wherein the transmission of the BS occurs on the determined one or more time-frequency resource units.

3. The method of claim 1, further comprising:
transmitting information associated with the determined one or more time-frequency resource units directly to the UE or indirectly to the UE via the serving BS of the UE.

4. The method of claim 1, further comprising:
transmitting the indication indicating the used one of the predefined one or more sets of transmission parameters directly to the UE or indirectly to the UE via the serving BS of the UE.

5. The method of claim 1, wherein the predefined one or more sets of transmission parameters and corresponding indications are known to the UE or to the serving BS of the UE.

6. The method of claim 1, wherein each of the one or more sets of transmission parameters includes one or more of:
modulation order;
number of spatial data streams;
data scrambling sequence;
coding rate;
interleaving;
transmission block size;
redundancy version;
transmission mode;
code word selection;
antenna ports;
identity used for reference sequence generation;
transmitted signal strength; and
transmission point information for the transmissions.

7. A method in a user equipment (UE) for interference cancellation (IC), the method comprising:
identifying, by means of receiving an indication, a set of transmission parameters used by a BS to configure a transmission of the BS, which is to interfere with downlink transmissions to the UE from a serving BS of the UE, the identified set of transmission parameters being a predefined set of transmission parameters where one or more of the transmission parameters in the predefined set constrained to take values from respective reduced sets of values out of the values available for the respective one or more transmission parameters, wherein the indication indicates the identified set of transmission parameters; and
performing the IC by using the identified set of transmission parameters.

8. The method of claim 7, further comprising:
receiving information associated with one or more time-frequency resource units, each of which corresponds to the identified set of transmission parameters,
wherein the transmission of the BS occurs on the determined one or more time-frequency resource units.

9. The method of claim 8, wherein the information associated with one or more time-frequency resource units is received directly from the BS or indirectly from the BS via the serving BS of the UE.

10. The method of claim 7, further comprising:
receiving the indication directly from the BS or indirectly from the BS via the serving BS of the UE.

11. The method of claim 7, wherein
the predefined set of transmission parameters and a corresponding indication are known to the UE; or
the predefined set of transmission parameters and the corresponding indication are known to the serving BS of the UE and are received by the UE from the serving BS of the UE.

12. The method of claim 7, wherein the identified set of transmission parameters includes one or more of:
modulation order;
number of spatial data streams;
data scrambling sequence;
coding rate;
interleaving;
transmission block size;
redundancy version;
transmission mode;
code word selection;
antenna ports;
identity used for reference sequence generation;
transmitted signal strength; and
transmission point information for the transmissions.

13. A base station (BS) for facilitating interference Cancellation (IC) at a User Equipment (UE), the BS comprising a processing circuit configured to:
predefine one or more sets of transmission parameters, where one or more of the transmission parameters in the one or more sets are constrained to take values from respective reduced sets of values out of the values available for the respective one or more transmission parameters, each set of the one or more sets of transmission parameters being identifiable by a unique indication; and
configure a transmission of the BS, which is to interfere with downlink transmissions to the UE from a serving BS of the UE, by using one of the predefined one or more sets of transmission parameters; and
send an indication indicating the used one of the of the predefined one or more sets of transmission parameters to the UE.

14. The BS of claim 13, wherein the processing circuit is further configured to determine one or more time-frequency resource units, each of which corresponds to at least one of the one or more sets of transmission parameters,
wherein the transmission of the BS occurs on the determined one or more time-frequency resource units.

15. The BS of claim 14, further comprising:
a first transmitting unit configured to transmit information associated with the determined one or more time-frequency resource units directly to the UE or indirectly to the UE via the serving BS of the UE.

16. The BS of claim 13, further comprising:
a second transmitting unit configured to transmit the indication indicating the used one of the predefined one or more sets of transmission parameters directly to the UE or indirectly to the UE via the serving BS of the UE.

17. The BS of claim 13, wherein the predefined one or more sets of transmission parameters and corresponding indications are known to the UE or to the serving BS of the UE.

18. The BS of claim 13, wherein each of the one or more sets of transmission parameters includes one or more of:
modulation order;
number of spatial data streams;
data scrambling sequence;
coding rate;
interleaving;
transmission block size;
redundancy version;
transmission mode;

code word selection;

antenna ports;

identity used for reference sequence generation;

transmitted signal strength; and transmission point information for the transmissions.

19. A user equipment (UE) for interference cancellation (IC) the UE comprising a processing circuit configured to:

identify, by means of receiving an indication, a set of transmission parameters used by a BS to configure a transmissions of the BS, which is to interfere downlink transmissions to the UE from a serving BS of the UE, the identified set of transmission parameters being a predefined set of transmission parameters where one or more of the transmission parameters in the predefined set of transmission parameters are constrained to take values from respective reduced sets of values out of the values available for the respective one or more transmission parameters, wherein the indication indicates the identified set of transmission parameters; and perform the IC by using the identified set of transmission parameters.

20. The UE of claim 19, further comprising:

a first receiving unit configured to receive information associated with one or more time-frequency resource units, each of which corresponds to the identified set of transmission parameters, wherein the transmission of the BS occurs on the determined one or more time-frequency resource units.

21. The UE of claim 20, wherein the first receiving unit is further configured to receive the information directly from the BS or indirectly from the BS via the serving BS of the UE.

22. The UE of claim 19, further comprising:

a second receiving unit configured to receive the indication directly from the BS or indirectly from the BS via the serving BS of the UE.

23. The UE of claim 19, wherein the identified set of transmission parameters and a corresponding indication are known to the UE; or the identified set of transmission parameters and the corresponding indication are known to the serving BS of the UE and are received by the UE from the serving BS of the UE.

24. The UE of claim 19, wherein the identified set of transmission parameters includes one or more of:

modulation order;

number of spatial data streams;

data scrambling sequence;

coding rate;

interleaving;

transmission block size;

redundancy version;

transmission mode;

code word selection;

antenna ports;

identity used for reference sequence generation;

transmitted signal strength; and transmission point information for the transmissions.

* * * * *

UNITED STATES PATENT AND TRADEMARK OFFICE
CERTIFICATE OF CORRECTION

PATENT NO. : 10,575,313 B2
APPLICATION NO. : 16/149952
DATED : February 25, 2020
INVENTOR(S) : Li et al.

Page 1 of 1

It is certified that error appears in the above-identified patent and that said Letters Patent is hereby corrected as shown below:

In the Specification

In Column 1, Line 37, delete "share" and insert -- shared --, therefor.

In Column 1, Line 38, delete "(PDCCH)/enhance" and insert -- (PDCCH)/enhanced --, therefor.

In Column 9, Line 58, delete "indentified" and insert -- identified --, therefor.

In the Claims

In Column 14, Line 65, in Claim 1, delete "used one of the of the" and insert -- used one of the --, therefor.

In Column 16, Line 20, in Claim 1, delete "interference" and insert -- Interference --, therefor.

In Column 16, Line 35, in Claim 13, delete "used one of the of the" and insert -- used one of the --, therefor.

Signed and Sealed this
Sixteenth Day of June, 2020

Andrei Iancu
*Director of the United States Patent and Trademark Office*